Aug. 8, 1933.    F. G. COTTRELL    1,921,564
PROCESS FOR RECOVERY OF IODINE AND/OR BROMINE FROM SOLUTIONS CONTAINING SAME
Filed July 15, 1931    2 Sheets-Sheet 1
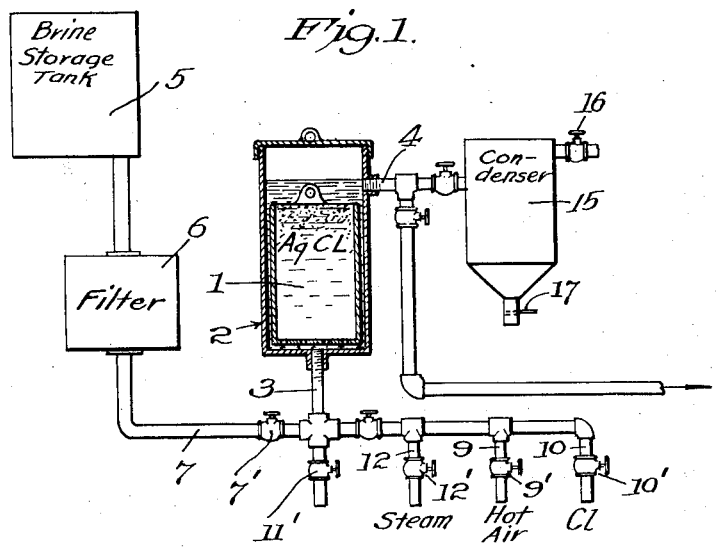
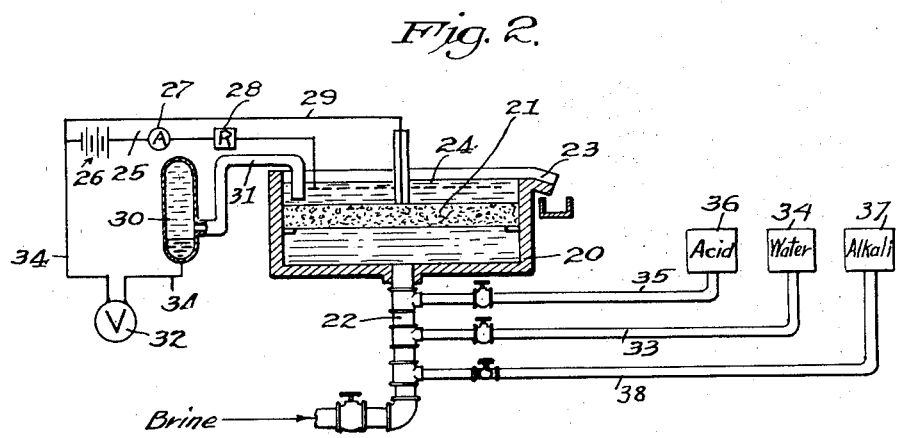
INVENTOR.
Frederick G. Cottrell,
BY Arthur P. Knight
Alfred W. Knight
ATTORNEYS.

Aug. 8, 1933.  F. G. COTTRELL  1,921,564
PROCESS FOR RECOVERY OF IODINE AND/OR BROMINE FROM SOLUTIONS CONTAINING SAME
Filed July 15, 1931  2 Sheets-Sheet 2

INVENTOR.
Frederick G. Cottrell,
BY Arthur P. Knight
Alfred W. Knight
ATTORNEYS.

Patented Aug. 8, 1933

1,921,564

UNITED STATES PATENT OFFICE 1,921,564

PROCESS FOR RECOVERY OF IODINE AND/OR BROMINE FROM SOLUTIONS CONTAINING SAME

Frederick G. Cottrell, Washington, D. C., assignor to General Salt Company, Los Angeles, Calif., a Corporation of California Application July 15, 1931. Serial No. 551,058

13 Claims. (Cl. 23—217)

This invention relates to a process for recovery of iodine and/or bromine from solutions containing same, and particularly for the recovery of iodine and/or bromine from solutions or brines containing iodides or bromides in extremely dilute solution. It has been found that the brines from certain wells, such as oil wells, contain, in some cases, a considerable amount of alkali metal or other iodides in amounts ranging, for example from 0.001 to 0.01 per cent, such solutions also usually containing considerable chlorides and some bromides. The methods of recovery of iodine or bromine from such solutions or brines which have been heretofore used may be divided into two classes:

1. Those in which the iodine or bromine is first liberated as free element in solution by addition of suitable accidulating and oxidizing agents and then removed either by treatment with a chemical reagent, for example, an organic compound, to form an insoluble precipitate or by transfer to a second phase, essentially immiscible with the first, this second phase being either solid e. g. charcoal; liquid, e. g. a hydrocarbon, or gas, e. g. air current. The iodine or bromine may be more or less concentrated by this preliminary change of phase, but it is in general further concentrated by subsequent re-extraction from the second phase into a third, usually aqueous, phase, from which after suitable chemical treatment it is either precipitated as solid and filtered off or distilled out and recondensed in at least relatively pure form.

2. Those in which the iodine or bromine is directly precipitated out of the solution or brine in the form of a solid sparingly soluble iodide or bromide of a heavy metal which is then separated from the remaining liquor by any suitable mechanical means, for example, filtration, sedimentation or centrifugal force.

The present invention belongs to the second class of operations above referred to in that the iodine or bromine is directly precipitated out of the solution or brine in the form of a comparatively insoluble metallic iodide or bromide; and an important object of the invention is to effect the precipitation in such manner that collection of the precipitate by subsequent filtration settling, et cetera is avoided, the metallic iodide or bromide being deposited and collected simultaneously with its formation so as to be available for further operation without filtration, sedimentation or other separating operation.

An important feature of the procedure of my invention is that instead of producing the precipitate of insoluble iodide or bromide or other iodine or bromine compound, out in the main body of the solution or brine by addition of a dissolved or relatively soluble reagent followed by mechanical separation of the insoluble iodine or bromine compound (which in such case is usually in a very fine form of subdivision) by mechanical means e. g. filtration or sedimentation, my process involves the direct percolation of the solution through a relatively coarse grained coherent mass consisting wholly or partly of solid relatively insoluble reagent, but which is still soluble enough as compared with the insoluble iodine or bromine compound to be formed to cause the extraction of the iodine or bromine from the solution (for example, by metathesis) leaving it on or in place of the said solid reagent.

As a reagent for use in connection with the reaction above referred to I may use, for example, silver chloride or oxide or certain compounds of copper or mercury, as hereinafter set forth, or I may use any other inorganic or organic solid compound which will react with the iodine or bromine component of the solution to cause deposition of a solid iodine or bromine compound in place of such reagent, and in any case I prefer to use such reagent in the form of a bed or body presenting interstices through which the liquid to be treated may be percolated so as to be brought into effective reactive contact with the reagent, and the operation is preferably carried out in such manner that the reactive body remains in substantially quiescent condition throughout the operation so that the metallic iodide is deposited in or on such percolation body in quiescent and collected condition and so that subsequent filtration or settling is not necessary for collection thereof. The process also includes a subsequent operation whereby the iodine or bromine is removed and recovered from the percolation body and at the same time said body is restored to reactive condition for cyclic operation. This regenerating stage of the process may be effected by a gaseous reagent and/or liquid reagent as hereinafter set forth.

The accompanying drawings illustrate apparatus suitable for carrying out my invention, Fig. 1 being a diagrammatic section of a form of the apparatus suitable for use in connection with the application for example of silver chloride as a reagent and also adapted for use where a gaseous reagent is used in the regenerating stage of the process.

Fig. 2 is a vertical section of a form of apparatus which may be used in connection with the application, as a reagent, of a compound of a metal such as copper or mercury having more than one valency, the form of apparatus here shown being also particularly adapted for use when the regenerating reagents as well as the original raw material are in liquid phase.

Figure 3:
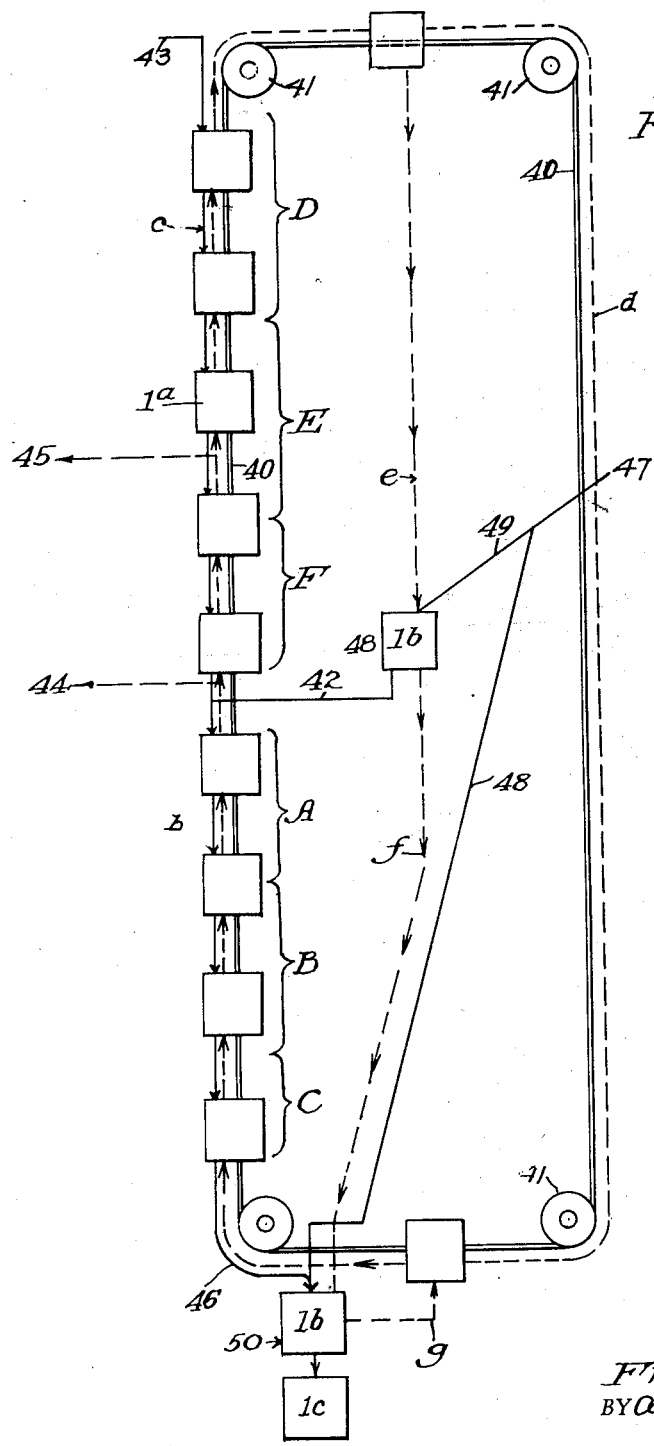
Fig. 3 is a flow sheet illustrating the operation of the process in a series of stages.

As an example of my process wherein silver chloride is used as a reagent, such chloride is formed into or distributed on or into a percolation body in any suitable manner. For example, fused silver chloride may be broken up into coarse grains or beads in any suitable manner and such grains or beads may then be assembled into a loose mass or pressed into block, plate or layer to form a percolation bed or body, of course sand or glass beads of suitable preferably approximately uniform dimension. For example, sand about 10 to 80 mesh in size may be coated with silver chloride, either by stirring the sand with just sufficient molten silver chloride to coat the sand grains with a thin layer thereof, or by cooling while rolling or stirring the mixture of sand and fused silver chloride until each sand grain is free from the others. The coated grains of sand may be formed into a lose bed, or they may be formed into a coherent pervious body by the application of pressure, with sufficient heat, if necessary to frit the grains together, while leaving sufficient interstices to permit free flow of liquid through the body. It will be understood that the granules of which the percolation body is composed are sufficiently coarse so that the body is of so open a structure as to not materially interfere with free flow of the liquid. It is also essential to the invention that the surfaces of the pores of the percolation body comprise a solid compound capable of reacting with the iodide or bromide in the solution to cause deposition of solid iodide or bromide in place of said compound.

The granules of the percolation body are sufficiently coherent to enable them to resist disintegration or abrasion during the percolating operation so as to effectively anchor the reacting material both before and after the reaction, in a collected body and thus dispense with the necessity of a collecting operation by filtration or otherwise.

If desired, the silver chloride, or other reagent used, may be incorporated into porous material, such as silica gel, diatomite, pumice, charcoal, et cetera formed into a coarse grained percolation body of either loose or coherent grains. In any case the surface of the mass may be mechanically protected by a coating of more or less gelatinous or water permeable material, through which diffusion may take place but which will protect the surface from mechanical disintegration or abrasion. Such a coating may consist of agar agar, gelatinous silicic acid, reprecipitated cellulose (hydrocellulose) etc.

The percolation body formed as above described is placed in any suitable receptacle provided with means for supply of the solution to be treated and for passage of such solution through the said body. For example, as shown in Fig. 1, a percolation body or bed indicated at 1, consisting of grains or beads formed of or coated with silver chloride, may be mounted in a tank 2 which is provided with an inlet pipe 3 for the solution to be treated and with an overflow or outlet 4 and valve 4' for the treated liquid. The liquid to be treated may be supplied to the tank 2 from a storage tank 5 through a pipe connection 7 provided with valve 7'. If a preliminary filtration is desired, a filter 6 may be included in such connection, as shown. The percolation body 1 may, if desired, be formed as a column or cartridge which may be removably mounted in the receptacle or tank 2, said tank having a removable cover 8, whereby it is normally made gas tight for the purpose hereinafter set forth.

A connection 9 with valve 9' may also be provided for supplying drying medium to the percolation body, such medium being for example dry or warm air supplied from any suitable source, and a connection 10 with valve 10' may also be provided for supplying regenerating agent (chlorine) as hereinafter described. A valve 11 is provided for drawing off the liquid contents of the tank when desired. A steam supply pipe 12 with valve 12' may also be provided. All of the pipes 7, 9, 10 and 12, preferably communicate with the bottom part of tank 2, for example, through inlet pipe 3. The outlet pipe 4 may lead through valve 4a to a condenser 15 provided with a discharge pipe 16 for gas and an outlet gate 17 for collected solid material.

In using the above described apparatus for carrying out my process for the recovery of iodine and/or bromine, the water or brine, either unfiltered or roughly filtered in the apparatus 6 to remove coarse sediment et cetera, is allowed to flow through the percolation body or bed 1 by opening valve 7 and in passing through said body, for example in an upward direction, a transfer or metathesis of the halide components takes place according to the reactions,

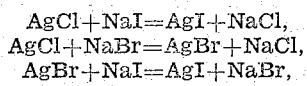

$$AgCl+NaI=AgI+NaCl,$$
$$AgCl+NaBr=AgBr+NaCl,$$
$$AgBr+NaI=AgI+NaBr,$$

with the result that iodine or bromine is deposited in fixed or stationary condition on the grains or beads of the percolation bed or body. Owing to the slight solubility of silver chloride the reaction is substantially limited to the portion of the liquid in immediate contact with the solid percolation body, which presents a coherent massive or macro-crystalline condition of the solid phase in contact with the solution, insuring deposition of the silver iodide or bromide in collected or massive condition, instead of in the finely divided or even colloidal condition that occurs when the reaction takes place in the absence of, or remote from, such a massive or macro-crystalline surface, the presence of relatively large crystals or masses in solid phase tending to reduce the solubility (see Findlay, The Phase Rule, London, 1917, foot note 1 to page 10). This action is particularly effective after deposition of solid silver iodide or bromide has been started, as the solid phase present is then in contact with a liquid phase containing the same constituent in potential form to precipitate into and further build up the macro-crystals of silver halide already existing in the percolation body.

In case both bromide and iodide are present in the water being treated, the operation will proceed in such manner that the percolation body will contain, in successive zones, passing in the direction of the flow, a deposit of solid iodide, a deposit of solid bromide, and unchanged silver chloride and the demarkations between these zones will advance toward the discharge end of the flue, replacing the bromide by iodide and the chloride by bromide. In case iodine only is to be recovered, the operation will be continued until substantially all of the deposit is in the form of metallic iodide, only sufficient other solid halides being left in the percolation mass to ensure complete removal of iodine from the brine.

To illustrate by a single concrete example the importance of the general principle here involved, let us consider the use of silver ion as the essential removing agent under the old type of procedure and my improved form thereof. In the old form AgNO$_3$ solution might be added to the original brine and (particularly in cases of low iodine content) a very finely divided or even colloidal suspension of silver iodide, containing perhaps some bromide and/or chloride representing excess of reagent added, would be formed and this then removed by mechanical means such as gravity or centrifugal sedimentation, filtration etc. Due to the excessively fine form of division of this material its complete mechanical collection presents real difficulties which coupled with the intrinsically higher solubility of these fine particles as above explained may lead to losses of both iodine and silver.

In the new form of procedure on the other hand even if started with exactly the same chemical reagent viz, AgNO$_3$, AgCl can be precipitated in strong solution whereupon it quickly assumes a relatively coarse curdy, or granular crystalline condition, having low intrinsic solubility and easily and completely separated from the solution without mechanical loss by either sedimentation or filtration. This precipitate can be used, in granular condition as a percolation body in carrying out the process above described, or it can be fused onto or incorporated in the pores of inert granular bodies as stated, so as to increase the effective surface for a given amount of the reagent. My new procedure includes all these variations.

A further advantage of my new procedure is that by carrying out the operation in a series of stages, as hereinafter described, the iodine and bromine may be deposited in different stages, and then separately released and recovered from these, thus giving immediate selective separation, and dispensing with the necessity of subsequent treatments for such separation.

The effect of the operation above described is to replace the silver chloride in the percolation mass with silver iodide or bromide, which remains in situ in the mass and is, therefore, in collected condition without requiring any filtration or settling operation. The iodine and bromine may then be recovered from the percolation mass in any suitable manner, for example, by closing valves 7', 9', 10' and 12' and opening valve 11', the liquid may be drained from tank 2, and then after closing valve 11' and opening valve 9', warm or dry air may be forced through the tank 2 so as to dry the percolation mass and bring it to proper temperature. The percolation mass or body may be brought up to and maintained at proper temperature either by passing hot air and/or steam therethrough, or by any other suitable means, it being understood that the reaction, being exothermic, itself contributes to maintenance of the temperature. Chlorine may then be admitted through valve 10' to tank 2 either alone or together with air (preferably hot) from pipe 9, and/or steam from pipe 12 so that a reconversion of the silver bromide or iodide into silver chloride takes place throughout the percolation body in tank 2 and at the same time free bromine or iodine is volatilized and passes off through the outlet 4, together with any air and/or steam which have been admitted, to the condenser 15, wherein the bromine or iodine is condensed and separated, while the air if any can pass off through pipe 16 from the condenser, any residual bromine or iodine carried off thereby being subsequently removed and recovered so far as necessary by ordinary well known means. Any steam present may also pass off through pipe 16, or may be condensed and removed along with the iodine or bromine.

An alternative procedure consists in substituting for the chlorine a reducing gas such as, for example, hydrogen, and supplying what heat may be necessary to ensure reaction. This results in the reduction of the heavy metal, for example, silver or copper, to the elementary form and the removal of the halogen in the gaseous form, primarily as the hydrogen halide; though, depending on the temperature and relative proportions of halogen and hydrogen present (especially in the case of iodine) more or less dissociation or decomposition of the compound may occur producing some free halogen in the gas stream. This gas stream however now contains the halogens sought in relatively concentrated and highly desirable form for collecting and converting into standard preparations of commerce as for example the free elements, their alkaline salts or the strong solutions of the free acids, by well known procedures. The heavy metal left behind in the percolation mass may either be dissolved out with appropriate acid and further worked up in any desired form or in such a case for example as silver, be reconverted back to the chloride in situ by treatment with either gaseous chlorine or a chloridizing solution.

When the material in the percolation mass has been regenerated as above described, the operation may be repeated upon a fresh quantity of brine as above described. If preferred, the regeneration of the silver bromide or iodide to silver chloride may be performed in a separate plant, the cartridge or mass consisting of or containing silver bromide and/or iodide being removed from the tank 2 and subjected to any suitable operation for recovery of the bromine and iodine therefrom and for regenerating silver chloride.

While silver chloride is an advantageous reagent for the above described operation on account of the extremely low solubility of silver chloride and the still lower solubility of silver bromide and iodide, it is possible under proper conditions to utilize other reagents. For example, mercurous chloride, mercurous hydroxide or cuprous hydroxide may be used. In such case, the apparatus shown in Fig. 2 may advantageously be used in performing the metathetic operation required for separation of the bromine and/or iodine from the brine, said figure showing a unit of said apparatus. This unit comprises a tank or vessel 20 within which is mounted a percolation mass or body 21 which may consist, for example, of granular carbon impregnated or coated with a suitable reagent such as cuprous hydroxide or mercurous hydroxide. Said tank is provided with an inlet 22 for brine, and an overflow outlet 23, the arrangement being preferably such that the brine is introduced below the percolation body 21 and flows upwardly through said body.

In case a compound of metal of variable valency is used as the reagent, it is desirable to provide means for holding such compound at the desired valence which in the cases here cited is the lower valence. For this purpose an electrode 24 of non-attackable material, such as carbon, may be mounted within the fluid above the percolation body 21 and a circuit may be established including said electrode and the carbon of said percolation body serving as the other electrode and also including a source of electromotive force, so as to maintain a potential difference between the liquid being treated and the carbon of the percolation body (serving in the present illustration as negative electrode) of such magnitude as to counteract any oxidizing actions of the air or other dissolved or entrained oxidizing agent in the liquid which is being treated and which oxidizing agent would otherwise partly convert the $Hg^+$ or $Cu^+$ compounds in the percolation body or in the solution to $Hg^{++}$ or $Cu^{++}$ compounds and thus result in production of compounds of such high solubility as to cause undue removal of same from the percolation body by solution in the liquid. The electromotive force so applied, however, must not be so large as to reduce the "ous" compounds in the percolation mass to metal.

The electrical circuit means for applying potential difference as above described, may comprise an electromotive source 26 connected through connection 25, including an ammeter 27 and regulable resistance 28, to the electrode 24 aforesaid, the negative terminal of said source being connected by wire 29 to the percolation body 21, which contains sufficient carbon to render it metallically conducting. For proper determination of the potential difference applied in this manner, any suitable single potential measuring means may be used, for example, a standard half cell 30 (see Lewis, "A System of Physical Chemistry", London 1916, page 293), presenting a constant potential difference may communicate at one side through an electrolytic connection 31 with the liquid in tank 20, and at the other side through wire 34 and potentiometer or voltmeter 32 with the wire 29 connected to the negative side of electromotive source 26, and to the body 21. The potential difference applied between electrodes 21 and 24 is maintained at the required value, according to the indications of potentiometer or voltmeter 32 by adjusting resistance 28 and/or electromotive force of source 26.

The ammeter 27 indicates the current necessary to effect reduction of any of the metallic ions in the higher states of oxidation or other oxidizing agents, reacting the percolating electrode, see (Zeitschrift für Physickalische Chemie, Leipzig 1903—vol. 42, p. 385).

In the operation of my process, using the apparatus shown in Fig. 2, for the recovery of iodine and/or bromine from a brine or solution, such brine or solution is passed preferably upward through the percolation mass, which may consist of granular carbon, coated or impregnated for example with cuprous oxide and/or oxychloride, with the result that the cuprous oxide and/or oxychloride in said body is replaced by cuprous iodide and/or bromide. During this operation sufficient hydrogen ion concentration should be maintained in the solution being treated to enforce deposition of the cuprous iodide, and prevent reversing of the reactions but not so high as to occasion unnecessary solubility of the cuprous oxide or oxychloride. In this connection, it may be stated that the term oxide is used herein to indicate both the anhydrous or hydrated (hydroxide) forms. For this purpose either acid or alkali may be supplied to the solution through a valved pipe 35 or pipe 38 from tank 36 or tank 37 respectively. When this operation has been completed a solution of sufficient hydroxyl concentration, for example alkali metal hydroxide or carbonate, may be supplied to the vessel 20 from a tank 37 through a pipe 38, such reagent passing upwardly through the percolation mass so as to reverse the operation and reconvert the cuprous bromide or iodide to cuprous hydroxide and produce alkali metal bromide or iodide which dissolves and passes off with the overflow liquid. Such solution of alkali metal bromide or iodide may, by suitably proportioning the strength of the alkali solution used and its temperature and rate of flow, be made sufficiently concentrated to permit the alkali metal bromide or iodide to be readily separated by crystallization or cooling or to be otherwise suitably treated for recovery of the bromine or iodide in commercial form. The percolation body may be washed before and after each of the above described operations by water supplied from supply means 34 through a valved pipe 33.

After simply crystallizing the halides from this liquor, by cooling, fresh alkali may be added to the mother liquors, these, heated to increase the solubility, are used as extracting liquors for a succeeding extraction, the cycle of operations being then repeated, indefinitely or at least until accumulation of minor impurities makes a fresh solution desirable.

It will be understood that instead of cuprous hydroxide I may use mercurous hydroxide or any other compound of sufficiently low solubility in the brine and capable of reacting with the alkali metal bromide or iodide in the solution so as to cause replacing of such compound with a bromine or iodine compound, and of subsequent regeneration for repetition of the cycle in a manner analogous to that described for the compounds considered above.

Mercurous chloride as well as silver chloride is of sufficiently low solubility to enable it to be used in connection with my process either with the form of apparatus shown in Fig. 1 (especially when oxidizing influences are either absent or their effects otherwise controlled) or in connection with the form of apparatus shown in connection with Fig. 2. It will be understood also that in case silver chloride is used the form of apparatus shown in Fig. 2 may be utilized in place of that shown in Fig. 1. In this case, however, means for maintaining a forced potential difference between the liquid and the percolation mass will not in general be necessary. Regeneration of the silver chloride may be effected by liquid reagent in the apparatus shown in Fig. 2 instead of gaseous reagent as described in connection with the form shown in Fig. 1, or liquid reagent may even be used in the apparatus shown in Fig. 1 by slight adaptations.

While in the case of cuprous and mercurous hydroxides (or oxides) it appears easy and feasible by moderate and easily attainable variations of the pH to reverse in either direction the reactions $$MOH + NaI = MI + NaOH$$
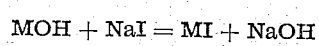

wherein M represents either a mercurous or cuprous atom, the relative chemical affinities and solubilities, for example, of silver hydroxide (or oxide) and iodide appear to be such that from the practical operating standpoint an inexpediently high hydroxyl ion or low iodide ion concentration must be maintained in the solution in order to make the reaction proceed from right to left when M represents silver atom.

In a case of this kind the difficulty may sometimes be overcome by effecting the regeneration to the original reagent, by passing in two or more chemical steps, instead of one. Thus in the case of silver iodide, this may first be treated with a soluble sulfide such as $H_2S$, $Na_2S$, $CaS$ or the like, for example, as indicated by the equation:—

$$2AgI + K_2S = Ag_2S + 2KI.$$

This may be done in strong hot solution and with crystallization of the KI on cooling and the mother liquor then recharged with further soluble sulfide and used again cyclically to extract the next batch of AgI coming on for treatment.

After washing out any excess of $K_2S$ or KI from the percolation body now containing all the silver in the form of $Ag_2S$, this may be treated with a chloridizing agent such as free chlorine itself, javelle water, ferric chloride solution et cetera, through which procedure the silver is again converted to AgCl and the sulphur to soluble sulphate which washes out in the converting solution and/or in the following brine.

As an alternative to the above sulphide cycle the silver iodide may be treated with an alkaline solution of a reducing agent such as formaldehyde or a reducing sugar in which case the iodide of the alkali will be extracted in dissolved form and may be crystallized out in cyclical operations analogous percolation mass and may be reconverted to chloride in situ by treatment with free chlorine or other suitable chloride agent.

In dealing with extreme cases of dilution of the halide sought in brines such for example, as iodine in sea water itself where it has been reported to be less than one part per ten million, we are rapidly approaching the limits of solubility of silver iodide in pure water itself and may actually have exceeded its solubility in the pure state in the brine. However, even when this is the case it may still deposit out to some extent in solid solution in compounds crystallizing isomorphically with it. Thus if there were sufficient isomorphism, for example, between silver chloride and silver iodide to allow them to form solid solutions in one another, the presence of an excess of solid silver chloride in contact with the brine would effectuate the deposition of a certain proportion of silver iodide in solid solution in the silver chloride even though the brine solution did not contain sufficient iodine ion, even when provided with an equivalent amount of silver ion, to become saturated with respect to even macro-crystalline pure silver iodide. Another beneficial effect of the excess of solid silver chloride would result from the saturation of the brine with silver ions in excess of those just equivalent to the iodine ions in solution and thus further decrease the solubility of the silver iodide (both toward the pure solid silver iodide as solid phase or toward the solid solution of silver iodide in silver chloride) through the well known relation of the "solubility product".

In case one were actually working with brines whose iodine concentration falls within or close to the immediately above described category, it might be desirable or necessary to move each collecting unit over into the regenerating part of the cycle when a certain concentration of AgI in solid solution in AgCl had been reached instead of attempting to wait until the chloride was substantially completely converted to iodide.

In cases of brines so highly diluted in the desired constituent the steps for recovery of the silver in the final discharge solution from the iodine collecting units become of greatly enhanced importance and the cost of this even becomes the economically limiting factor.

I am aware that it has been proposed to effect recovery of halogens from brines by use of a reagent in the form of a slurry. The distinction between such a procedure and that herein disclosed lies chiefly in the definite control of the minimum particle or granule size of both the solid reagent and/or product separation nucleus involved in the present process.

The herein described process uses granules of definite and relatively uniform size so as to insure (1) all of the solid reagent and desired product forming part of granules of definite minimum weight or size such as to permit quick and easy separation between them and the liquid; (2) substantial uniformity and predetermined minimum cross section of the percolation pores or spaces when the granules are compacted together such as not to fill up with mechanically suspended solids including colloids in the medium to be percolated and still insure deposition of the desired constituents.

In any of the above described embodiments of my invention, the described operations may be carried out in any desired stages, for example, in a series of tanks arranged for successive operation and with counter current flow of the liquid with respect to sequence of operations in the respective tanks. Fig. 3 is a flow sheet or diagram illustrating such a multistage operation. The brine is percolated successively through a series of tanks 1a, each tank containing a cartridge or percolation body such as above described. These tanks are connected to any suitable means for bringing them successively into operative position. For example they may be mounted on a carrier or conveyor 40 travelling over suitable supports 41 and operated continuously or intermittently by suitable means, not shown, so as to shift the said tanks upwardly in a vertical path indicated by the dotted arrows. In the course of the upward travel from the bottom of the series, the tanks are supplied with raw brine or solution which is indicated as passing from a supply line 42 downwardly through the series of tanks as shown by the full line arrows b, so as to pass successively through the tanks in a direction counter current to the transfer of the tanks. It will be understood, however, that in practice as above described the connections may be made in such manner that the solution will flow upwardly through each individual tank and will pass from the upper part of each tank to the lower part of the next lower tank. The waste solution finally passes off at 46 from the lowermost tank.

The effect of the reaction between the solid reagent in the respective percolation bodies and the iodine and bromine compounds in the brine is to cause deposition of solid iodide in one or more of the stages through which the brine first flows from the supply line indicated at 42, the zone of such iodide deposition being indicated at A, and following this zone A, there is a zone B in which solid bromide is deposited, and finally a zone C containing the original silver chloride or other solid reagent, the iodine and bromine being substantially removed from the solution before reaching this zone. In explanation of this effect, it may be stated that since the iodide of silver, for example, is more insoluble than the bromide of silver, the iodide will be first deposited. The sharpness of demarkation of these zones will in practice, of course, depend on several factors as, for example, relative and absolute concentrations of the halide ions in the brine; relative solubility of pure halides in the liquid; extent of isomorphism or capacity for forming solid solution; the rate and uniformity of flow of brine through the percolation mass; size of granules of the latter; and the depth of impregnation or thickness or coating with reagent.

The operation of the carrier means 40, progressively advances the tanks 1a upwardly in counter current to the movement of the fluid through the series, and when the depositing operation has been completed the same carrier may serve to advance the tanks further upwardly in position for regenerating operation. Such operation may be effected by a regenerating reagent either gaseous or liquid, such as above described, supplied to the uppermost tank in the series through means indicated by line 43 and passing through the respective tanks, as indicated by the full line arrows c, in counter current to the motion of transfer of the tanks. In this operation the reaction between the regenerating reagent and the bromide and iodide deposit in the percolation body in the respective tanks will, in general, set free the iodine and bromine at different stages of the operation so that these constituents may be thus separately collected, either in the form of free element or as soluble halide salts, or as other compounds, depending upon the particular reagent employed.

For example, if chlorine is used as the regenerating reagent, as above described, iodine will be set free, commencing in the uppermost tank of the series in the regenerating stage, and will be carried through the successive tanks and off through a line indicated at 44 to any suitable receiving means. As the iodine content of the uppermost tank is exhausted the regeneration of silver chloride and removal of iodine will advance to the succeeding tanks. Any silver bromide present in the cells through which free chlorine is passing will also be converted to silver chloride, setting free bromine, but the latter as it passes forward through the percolation masses reacts with the silver iodide therein to set free iodine, so that as long as there is any silver iodide remaining in a given portion of the percolation mass, substantially no free bromine will be present, but when the silver iodide is exhausted, in any such portions, free bromine can appear.

There are thus eventually produced in the percolation mass an initial zone D, in which the regeneration is completed and which contains only chloride and gaseous chlorine, an intermediate zone E, containing bromine vapor, silver bromide, and possibly some of the original silver chloride, which has escaped reaction with the brine, but no iodide and no free chlorine or iodine, and a first zone F containing iodine vapor, silver iodide and possibly silver chloride and silver bromide, but no free chlorine or bromine. The free iodine and bromine may be drawn from the respective zones F and E by conduits 44 and 45.

The tanks or cells, after completion of the regenerating operation, are transferred by the carrier 40 along the path indicated by the dotted line d, so as to be eventually returned to the bottom of the series of tanks.

In some cases particularly when a compound of a relatively valuable metal, such as silver or mercury, is used as the depositing reagent, it is important to provide for saving any such metal that may pass off in the solution going to waste at 46 as above described. For this purpose I may proceed as follows: After determination of the percentage of silver, for example, present in the waste liquid, a suitable flow of brine may be drawn from the original supply line 47 through a connection 48 and mixed with the solution issuing at 46 to form a supersaturated solution or colloidal precipitate of silver iodide without unnecessary excess of either silver or iodine ion in the mixture. The liquid is then passed through a cell indicated at 1b containing silver iodide and serving as an inoculating surface for insuring the collection of the potential precipitate constituted by the supersaturated content and/or the colloidal precipitate in the solution. This deposition of the silver iodide on the granular mass in the cell 1b follows from the fact that in said mass the silver iodide is in massive or macro-crystalline condition and therefore enforces deposition both of the supersaturated content of the solution and of the constituent of the colloidal precipitate referred to for the reason that the solubility of said constituent is greater in the case of the colloidal or finely divided particles than it is in the case of the larger or macro-crystalline particles of the percolation mass in the tank 1b. (See The Phase Rule, Findlay, London 1917, page 10).

The cell 1b above referred to may be drawn or selected from the top of the ascending series of cells or tanks 1a at any appropriate intervals in the operation and instead of passing by the path indicated at d, it may be transferred along a path indicated at e to a position indicated at 48, and may be there supplied with raw brine from the source 47 as indicated by line 49 until there has been a complete conversion of the silver chloride in said tank to silver iodide. The waste from tank 1b at position 48 may pass to the supply line 42 above referred to for the main series of tanks in the depositing operation. The tank 1b may then be transferred as indicated by the dotted line f to the position 50 at which it receives the waste from line 46 together with a suitable amount of raw brine as above described. After the material in tank 1b has taken up a suitable amount of silver compound it may be transferred as indicated by the path g to the carrier means 40 so as to be carried into the main series of tanks for the depositing operation, it being understood that in this case the material in said tank will pass upwardly more or less without change until it reaches the regenerating stage, the object of the above procedure being to provide for convenient interpolation of this silver saving cell in the regenerating zone.

If desired, however, the cell 1b may be taken directly from the top of the extraction zone A, as the reagent therein has been fully converted to iodine at that point, and may be transferred along the path h to the position 50 for reception of the waste liquor together with raw brine, so as to receive dissolved silver as above described.

If necessary a further cell or tank 1c may be provided connected to receive the waste from tank 1b and containing a collecting mass or body consisting of or coated with a suitable compound capable of precipitating any residual silver in the solution, for example, cell or tank 1c may contain zinc sulphide, causing silver sulphide to be deposited in said tank and such silver sulphide may be treated in any suitable manner to recover silver, or the final collecting cell 1c may consist of an electrolytic cell for electrolytically depositing silver analogous in construction for example, to the electrolytic unit described above but operated at a potential sufficient to efficiently extract essentially all of the desired metal from the solution.

It will be understood that if desired the cell 1b may be dispensed with and the waste from the main deposit cells or tanks at 46 may pass directly to the collecting cell 1c containing a suitable precipitating reagent or other means for removal and collection of the silver or other valuable constituent contained in such waste solution, no fresh brine being added in that case to the waste passing to cell 1c.

I claim:

1. In a process for recovering iodine or bromine from dilute solutions of iodides or bromides, the step which consists in percolating such solutions through a pervious body of so open a structure as not to materially interfere with free flow of liquid through the pores of said body comprising a solid compound capable of reacting with the iodide or bromide in solution to cause deposition of solid iodide or bromide in place of said compound.

2. In a process for recovering iodine or bromine from dilute solutions of iodide or bromide, the step which comprises bringing such solutions in reactive contact with a quiescent granular body whose granules are sufficiently large to provide, even when close packed, so open a structure as not to materially interfere with free flow of liquid through the interstices between said granules comprising a compound of a metal, said compound being in solid phase and being of low solubility in said solution, but of a solubility greater than the iodide or bromide of the same metal so as to cause deposition of solid iodide or bromide in place of said compound.

3. A process for recovering iodine or bromine from dilute solutions of iodide or bromide, the operation of which comprises bringing such solution in reactive contact with a quiescent granular body the surfaces of the granules of said body comprising a compound of a metal, said compound being in solid phase and being of low solubility in said solution but of a solubility greater than the iodide or bromide of the same metal so as to cause deposition of solid iodide or bromide in place of said compound and subsequently subjecting the solution containing metal dissolved from said compound to the action of a precipitating agent to recover such metal therefrom.

4. In a process for recovering iodine or bromine from dilute solutions of iodide or bromide the operation which comprises bringing such solutions in reactive contact with a quiescent granular body the surfaces of the granules of said body comprising a compound of a metal, said compound being in solid phase and being of low solubility in said solution but of a solubility greater than the iodide or bromide of the same metal so as to cause deposition of solid iodine or bromine compound in place of the compound in said body, and subsequently subjecting the solution containing metal dissolved from said compound to the action of a precipitating agent to recover such metal therefrom, said precipitating agent consisting of an additional portion of the raw solution from the aforesaid dilute solution so as to produce a potential precipitate of iodine or bromine compound and comprising the further step of bringing such potential precipitate in contact with a deposition enforcing body whose surface consists of material isomorphic with said precipitating iodide or bromide.

5. In a process for recovering iodine or bromine from dilute solutions of iodide or bromide, the step which consists in percolating said solution through a pervious body having its surface composed of a compound of a metal, said compound being in solid phase, and the solubility of said compound in said solution being greater than the iodide or bromide of the same metal, so as to cause deposition of solid iodide or bromide in place of said compound.

6. A process for recovering iodine or bromine from dilute solutions of iodide or bromide which consists in percolating such a solution through a percolation body comprising a metal chloride in solid phase so as to cause deposition of solid iodide or bromide in place of said metal chloride and subsequently passing chlorine-bearing gas in contact with said percolation body to reproduce the original metal chloride and remove iodine or bromine therefrom and collecting the iodine or bromine so removed.

7. A process for recovering iodine or bromine from dilute solutions of iodide or bromide which consists in percolating such solutions through a percolation body having surfaces consisting of a solid metallic hydroxide capable of reacting with the dissolved iodide or bromide to cause deposition of solid iodide or bromide in place of said hydroxide, and subsequently passing in contact with such percolation body a liquid reagent containing a soluble hydroxide so as to reproduce the original metal hydroxide in the percolation body and carry away with the liquid reagent a soluble iodide or bromide resulting from reaction of said reagent with the deposited solid iodide or bromide.

8. A process for recovering iodine or bromine from dilute solutions of iodide or bromide which consists in percolating such a solution through a percolation body comprising a solid metal compound of low solubility in such solution and capable of reacting with the dissolved iodide or bromide to cause deposition of solid metal iodine or bromine compound in place of the aforesaid compound, and subsequently passing through said percolation body a fluid reagent or reagents capable of reacting with the deposited metal iodide or bromide to reproduce the original metal compound and remove and carry away the iodine or bromine of the deposited iodide or bromide.

9. The process for recovering iodine and bromine from dilute solutions of iodide or bromide which consists in passing such solution successively through a plurality of percolation bodies, each of such bodies containing a compound capable of reacting with the iodide or bromide in solution to cause deposition of iodine and/or bromine compound on said body in place of the aforesaid compound, and subsequently passing regenerating agent successively through said percolation bodies, said regenerating reagent being capable of successively removing said deposited iodine and/or bromine compound therefrom and reproducing the original compound in such bodies and separately recovering the iodine and bromine compounds so removed.

10. In a process for recovering iodine or bromine from dilute solutions of iodide or bromide the step which consists in percolating said solution through a percolation body whose pore surfaces comprise a compound of a metal in solid phase, the solubility of said compound in said solution being greater than that of the iodide or bromide of the same metal so as to cause deposition of solid iodide or bromide in place of said compound, and the said pore surfaces of said percolation body being coated with a water permeable material through which diffusion may take place but which serves to protect the surface from mechanical distintegration.

11. A process for recovering iodine or bromine from dilute solutions of iodide or bromide which consists in percolating such solution through a percolation body having surfaces comprising a solid metallic hydroxide capable of reacting with the dissolved iodide or bromide to cause deposition of solid iodide or bromide in place of said hydroxide, said hydroxide being the hydroxide of a metal having more than one valence and being held at the lower valence by electro-chemical action.

12. A process as set forth in claim 11 and comprising the subsequent step of extracting the iodine and/or bromine from the percolation body and simultaneously regenerating the solid hydroxide therein by treatment with solutions of readily soluble alkalies of sufficient hydroxyl concentration.

13. A process for recovering iodine and/or bromine from dilute solutions of iodide and/or bromide which consists in percolating such solution through a percolation body having surfaces comprising a sparingly soluble solid metallic compound of a metal having more than one valence and capable of reacting with the dissolved iodide and/or bromide to cause the deposition of solid iodide and/or bromide in place of said compound, the metal of multiple valence in these compounds being held at the desired valence by electrochemical action.

FREDERICK G. COTTRELL.